US011039206B2

(12) United States Patent
Cava

(10) Patent No.: US 11,039,206 B2
(45) Date of Patent: Jun. 15, 2021

(54) DIFFERENTIAL MEDIA PRESENTATION DESCRIPTIONS FOR VIDEO STREAMING

(71) Applicant: HULU, LLC, Santa Monica, CA (US)

(72) Inventor: Zachary Cava, Seattle, WA (US)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 16/378,300

(22) Filed: Apr. 8, 2019

(65) Prior Publication Data

US 2019/0313150 A1 Oct. 10, 2019

Related U.S. Application Data

(60) Provisional application No. 62/654,964, filed on Apr. 9, 2018.

(51) Int. Cl.
*H04N 21/4402* (2011.01)
*H04N 21/278* (2011.01)
(Continued)

(52) U.S. Cl.
CPC ....... *H04N 21/4402* (2013.01); *H04L 65/604* (2013.01); *H04N 21/278* (2013.01);
(Continued)

(58) Field of Classification Search
CPC ........... H04N 21/232; H04N 21/23424; H04N 21/2387; H04N 21/433; H04N 21/44016
(Continued)

(56) References Cited

U.S. PATENT DOCUMENTS 6,665,726 B1 * 12/2003 Leighton ................ H04L 29/06 709/205
8,752,085 B1 6/2014 Brueck et al.
(Continued)

FOREIGN PATENT DOCUMENTS

WO 2012093202 A1 7/2012
WO 2014176014 A1 10/2014

OTHER PUBLICATIONS

Article entitled: "Information Technology—Dynamic Adaptive Streaming Over HTTP (DASH)"; ISO/IEC 23009-1; Second edition; May 15, 2014; 152 pages.
(Continued)

*Primary Examiner* — Dominic D Saltarelli
(74) *Attorney, Agent, or Firm* — Fountainhead Law Group

(57) ABSTRACT

In some embodiments, a method sends a first instance of a media presentation description to a client for a first set of segments of a media presentation. The first instance of the media presentation description includes status information based on the first set of segments in the media presentation. A request is received for an update to the media presentation description where the request includes the status information. The method uses the status information to identify a latest segment that the client has already received in the media presentation. Then, the method sends a second instance of the media presentation description for a second set of segments that occur after the latest segment in the media presentation as an update to the first instance of the media presentation description. The second instance of the media presentation description excludes at least a portion of information for first set of segments.

21 Claims, 13 Drawing Sheets

(51) Int. Cl.

| | |
|---|---|
| ***H04N 21/61*** | (2011.01) |
| ***H04N 21/431*** | (2011.01) |
| ***H04N 21/81*** | (2011.01) |
| ***H04L 29/06*** | (2006.01) |
| ***H04N 21/478*** | (2011.01) |

(52) U.S. Cl.
CPC ..... *H04N 21/4314* (2013.01); *H04N 21/4316* (2013.01); *H04N 21/478* (2013.01); *H04N 21/6125* (2013.01); *H04N 21/6175* (2013.01); *H04N 21/8133* (2013.01)

(58) Field of Classification Search
USPC .................................................... 725/87, 112
See application file for complete search history.

(56) References Cited

U.S. PATENT DOCUMENTS

| | | | | |
|---|---|---|---|---|
| 9,510,025 | B1 | 11/2016 | Einarsson et al. | |
| 2003/0101144 | A1 | 5/2003 | Moreno | |
| 2011/0179356 | A1 | 7/2011 | Bassali et al. | |
| 2011/0255535 | A1* | 10/2011 | Tinsman ................ | H04L 47/10 370/390 |
| 2014/0019587 | A1 | 1/2014 | Giladi | |
| 2014/0143806 | A1* | 5/2014 | Steinberg ............. | G11B 27/034 725/34 |
| 2014/0222962 | A1 | 8/2014 | Mao et al. | |
| 2015/0106841 | A1 | 4/2015 | Wolf et al. | |
| 2015/0324379 | A1* | 11/2015 | Danovitz .............. | G06F 16/951 707/825 |
| 2016/0182582 | A1* | 6/2016 | Wagenaar ........... | H04L 65/4069 709/231 |
| 2016/0261677 | A1* | 9/2016 | Lotfallah ................ | H04L 67/42 |
| 2016/0294894 | A1 | 10/2016 | Miller | |
| 2016/0345074 | A1 | 11/2016 | Serbest et al. | |
| 2019/0296840 | A1* | 9/2019 | Vermeyden ........ | H04N 21/4825 |

OTHER PUBLICATIONS

U.S. Appl. No. 16/378,384, filed Apr. 8, 2019 by Cava et al. (Unpublished).

International Search Report & Written Opinion for PCT Application PCT/US2019/026574 dated Aug. 5, 2019, 13 pages.

International Search Report & Written Opinion for PCT Application PCT/US2019/026563 dated Jul. 25, 2019, 13 pages.

* cited by examiner

400

408, 402, 404, 406

```
<?xml version="1.0" encoding="utf-8"?>
<MPD type="dynamic" xmlns="urn:mpeg:dash:schema:mpd:2011" ...>
  <Location>https://example.com/dash/live/channel.mpd?t=70</Location>
  <Period id="foo-1" start="PT0.0S">
    <AdaptationSet id="1" mimeType="video/mp4" ...>
      <SegmentTemplate presentationTimeOffset="0" timescale="1" ...>
        <SegmentTimeline>
          <S d="10" t="0"/>
          ...
          <S d="10" t="60"/>
        </SegmentTimeline>
      </SegmentTemplate>
      <Representation id="1080_30" .../>
      <Representation id="720_30" .../>
      ...
    </AdaptationSet>
    <AdaptationSet id="2" mimeType="audio/mp4" ...>
      <SegmentTemplate presentationTimeOffset="0" timescale="1" ...>
        <SegmentTimeline>
          <S d="5" t="0"/>
          ...
          <S d="5" t="60"/>
        </SegmentTimeline>
      </SegmentTemplate>
      <Representation id="2_0" .../>
    </AdaptationSet>
  </Period>
</MPD>
```

```
<?xml version="1.0" encoding="utf-8"?>
<MPD>
  <Location>https://example.com/dash/live/channel.mpd?t=90</Location>
  <EssentialProperty schemeIdUri="urn:com:hulu:schema:mpd:2017:patch"/>
  <Period id="foo-1">
    <AdaptationSet id="1">
      <SegmentTemplate>
        <SegmentTimeline>
          <S d="10" t="70"/>
          <S d="10" t="80"/>
        </SegmentTimeline>
      </SegmentTemplate>
    </AdaptationSet>
    <AdaptationSet id="2">
      <SegmentTemplate>
        <SegmentTimeline>
          <S d="5" t="70"/>
          <S d="5" t="75"/>
          <S d="5" t="80"/>
          <S d="5" t="85"/>
        </SegmentTimeline>
      </SegmentTemplate>
    </AdaptationSet>
  </Period>
</MPD>
```

```
<?xml version="1.0" encoding="utf-8"?>
<MPD>
  <Location>https://example.com/dash/live/channel.mpd?t=90</Location>
  <EssentialProperty schemeIdUri="urn:com:hulu:schema:mpd:2017:patch"/>
  <Period id="foo-2" start="PT70.0S">
    <AdaptationSet id="1" mimeType="video/mp4" ...>
      <SegmentTemplate presentationTimeOffset="70" timescale="1" ...>
        <SegmentTimeline>
          <S d="10" t="0"/>
          <S d="10" t="10"/>
        </SegmentTimeline>
      </SegmentTemplate>
      <Representation id="1080_30" .../>
      <Representation id="720_30" .../>
      ...
    </AdaptationSet>
    <AdaptationSet id="2" mimeType="audio/mp4" ...>
      <SegmentTemplate presentationTimeOffset="70" timescale="1" ...>
        <SegmentTimeline>
          <S d="5" t="0"/>
          <S d="5" t="5"/>
          <S d="5" t="10"/>
          <S d="5" t="15"/>
        </SegmentTimeline>
      </SegmentTemplate>
      <Representation id="2_0" .../>
    </AdaptationSet>
  </Period>
</MPD>
```

```
<?xml version="1.0" encoding="utf-8"?>
<MPD>
  <Location>https://example.com/dash/live/channel.mpd?t=90</Location>
  <EssentialProperty schemeIdUri="urn:com:hulu:schema:mpd:2018:patch"/>
  <Period id="foo-1">
    <AdaptationSet id="1">
      <SegmentTemplate>
        <SegmentTimeline>
          <S d="10" t="80"/>
        </SegmentTimeline>
      </SegmentTemplate>
    </AdaptationSet>
    <AdaptationSet id="2">
      <SegmentTemplate>
        <SegmentTimeline>
          <S d="10" t="80"/>
        </SegmentTimeline>
      </SegmentTemplate>
    </AdaptationSet>
  </Period>
  </Period>
  <Period id="foo-2" start="PT80.0S">
    <AdaptationSet id="1" mimeType="video/mp4" ...>
      <SegmentTemplate presentationTimeOffset="80" timescale="1" ...>
        <SegmentTimeline>
          <S d="10" t="0"/>
        </SegmentTimeline>
      </SegmentTemplate>
      <Representation id="1080_30" .../>
      <Representation id="820_30" .../>
      ...
    </AdaptationSet>
    <AdaptationSet id="2" mimeType="audio/mp4" ...>
      <SegmentTemplate presentationTimeOffset="80" timescale="1" ...>
        <SegmentTimeline>
          <S d="5" t="0"/>
          <S d="5" t="5"/>
        </SegmentTimeline>
      </SegmentTemplate>
      <Representation id="2_0" .../>
    </AdaptationSet>
  </Period>
</MPD>
```

| t | URL Requested | Segments Returned | MPD.Location in Response |
|---|---|---|---|
| 12 | .../CTN.mpd?start=0 | *a, b, c, d* | .../CTN.mpd?t=12 (1010) |
| 15 | .../CTN.mpd?t=12 | *e* | .../CTN.mpd?t=15 (1012) |
| 18 | .../CTN.mpd?t=15 | *f* | .../CTN.mpd?t=18 |
| 21 | .../CTN.mpd?t=18 | *g* | .../CTN.mpd?t=21 |
| 24 | .../CTN.mpd?t=21 | *h* | .../CTN.mpd?t=24 |
| 27 | .../CTN.mpd?t=24 | *i* | .../CTN.mpd?t=27 |
| 30 | .../CTN.mpd?t=27 | *j* | .../CTN.mpd?t=30 |

1100

1002 1004 1006 1008

| t | URL Requested | Segments Returned | MPD.Location in Response |
|---|---|---|---|
| 19 | .../CTN.mpd?start=0 | *a, b, c, d, e, f* | .../CTN.mpd?t=18 |
| 22 | .../CTN.mpd?t=18 | *g* | .../CTN.mpd?t=21 |
| 25 | .../CTN.mpd?t=21 | *h* | .../CTN.mpd?t=24 |
| 28 | .../CTN.mpd?t=24 | *i* | .../CTN.mpd?t=27 |
| 31 | .../CTN.mpd?t=27 | *j* | .../CTN.mpd?t=30 |

| t | URL Requested | Segments Returned | MPD.Location in Response |
|---|---|---|---|
| 19 | .../CTN.mpd?start=0 | *a, b, c, d, e, f* | .../CTN.mpd?t=18 |
| 22 | .../CTN.mpd?t=18 | <no response network error> | |
| 25 | .../CTN.mpd?t=18 | *g, h* | .../CTN.mpd?t=24 |
| 28 | .../CTN.mpd?t=24 | *i* | .../CTN.mpd?t=27 |

DIFFERENTIAL MEDIA PRESENTATION DESCRIPTIONS FOR VIDEO STREAMING

CROSS REFERENCE TO RELATED APPLICATIONS

The present disclosure claims priority to U.S. Provisional App. No. 62/654,964, entitled "DIFFERENTIAL MANIFESTS FOR VIDEO STREAMING", filed Apr. 9, 2018, the content of which is incorporated herein by reference in its entirety.

BACKGROUND

Live streaming requires continuous delivery of segments to clients using a media presentation description. Dynamic Adaptive Streaming over HTTP (DASH) is one type of live streaming protocol. In DASH, clients acquire segment information via polling protocols built into the DASH specification. To enable features like program start over, digital video recorder (DVR) windows, and seamless rollover, servers continually send updates to a media presentation description that includes all known stream information from the time the client joined the stream. The new media presentation description includes some new information for additional segments, but also includes all the previous information that was sent, such as stream initialization information and the previous segments. The repeated sending of this information wastes server and client computation time as well as bandwidth as very little new information is presented in a media presentation description that is received on each polling request.

BRIEF DESCRIPTION OF THE DRAWINGS

FIG. 4 depicts an example of a media presentation description according to some embodiments.

FIG. 6 depicts an example of a patch that extends in-memory media presentation description according to some embodiments.

FIG. 7 depicts a patch that extends the in-memory media presentation description by providing a new period whose identifier does not match any period in the in-memory media presentation description according to some embodiments.

FIG. 8 depicts a patch that extends the in-memory media presentation description for an existing period and also provides a new period according to some embodiments.

FIG. 11 depicts the second client's call table according to some embodiments.

FIG. 12 depicts a call table showing the failure recovery according to some embodiments.

DETAILED DESCRIPTION

Figure 1:
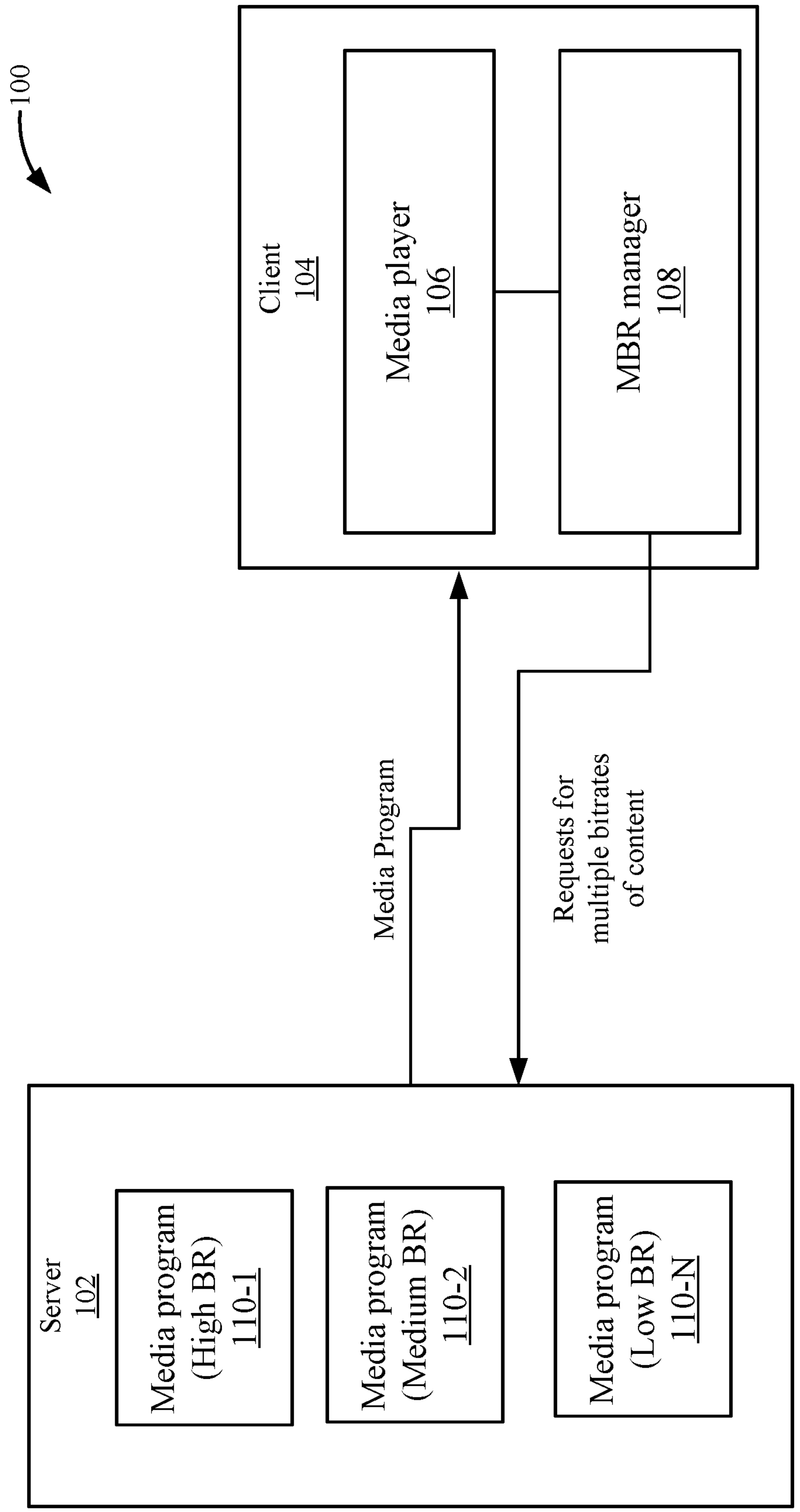
FIG. 1 depicts a system for a multiple bitrate (MBR) switching algorithm according to one embodiment.

Described herein are techniques for a video streaming system. In the following description, for purposes of explanation, numerous examples and specific details are set forth in order to provide a thorough understanding of some embodiments. Some embodiments as defined by the claims may include some or all of the features in these examples alone or in combination with other features described below and may further include modifications and equivalents of the features and concepts described herein.

Some embodiments calculate a differential of first information that is available for a media presentation and second information that a client has already received. Then, a server only sends the differential in a media presentation description to the client to reduce processing and transport costs. To stream a media presentation, such as one that is occurring live, a client needs to continually receive segment information from the server that describes the media presentation as it progresses in time. Conventionally, the segment information is sent by having the client refresh the media presentation description that the client has received on a periodic basis, in which the refreshed media presentation description would contain all segment information from the current point in time back to the original start of the media presentation when the client joined. As the media presentation continues, the media presentation description continues to grow in size with additional information for more segments, which takes more and more time to generate on the server side and more and more time to parse on the client side. Further, the client uses more and more memory to store the media presentation description as it grows. Also, all but the last few segments in the refreshed media presentation description will be a repeat of information the client already knows, causing the data transfer to be more and more wasteful.

To complicate matters more, for the clients to have seamless transition experiences from program to program, the clients cannot re-initialize their media players as it would cause momentary buffering and a black screen to be played and seen by a user. This is conventionally solved by having clients join a stream at a specific start time and growing the media presentation description to a maximum window size, and once the media presentation description reaches this maximum size, old segments are removed from the beginning as new segments are added to the end. This approach greatly increases the cache used by the media presentation description as users can join any program and remain on the stream until their authorization expires, which may mean 18 hours' worth of six hour media presentation descriptions must be served to the client, which increases the previously stated computational requirements for clients and servers.

Some embodiments use a differential based media presentation description (MPD) that continually extends a media presentation description via patches. The patches provide new information to a client without including all the previously sent information (e.g., a differential between all the known information and what information the client has received). A server inserts status information in the patches that the client uses to request the next segment or segments.

Using the status information, the server can know what information the client has already received and send only the newly required information.

The only current provisions for client extended timeline information within the DASH specification are the use of a negative repeat count for the last announced Segment entry (S@r) that signals the availability of future segments with equal duration and the inclusion of the next segment information within a movie fragment box (moof) of the last downloaded segment. While these provisions allow the timeline to be extended by the client, the provisions do not describe larger structure changes in the media presentation description such as period cuts or additional event stream data, so the client must still refresh the whole media presentation description to get this information. To bridge this gap, some embodiments send a media presentation description patch. Upon a client receiving the media presentation description patch, the client uses the patch to update an in-memory media presentation description instead of wholesale replacing the media presentation description.

System Overview

FIG. 1 depicts a system 100 for a multiple bitrate (MBR) switching algorithm according to one embodiment. System 100 includes a server 102 and a client 104. Although one instance of server 102 and client 104 are shown, multiple instances of server 102 and client 104 may be used.

Server 102 may deliver media presentations 110 to client 104. In one example, server 102 includes various media presentations, such as video (e.g., a title or show) that have been (or will be) encoded in multiple bitrates. For example, a media presentation 110 has been divided into segments that an encoder encodes at multiple bitrates, from high to low. As shown, a media presentation is stored in different versions (i.e., bitrates) as media presentation 110-1 (high bitrate), media presentation 110-2 (medium bitrate), . . . , and media presentation 110-N (low bitrate). The different bitrates provide videos at different levels of quality. For example, a higher bitrate video will be of a higher quality than the medium bitrate, and the medium bitrate of a higher quality than the lower bitrate. Although these encodings are described, various embodiments may include different encodings at any number of bitrates.

Client 104 may include various user devices, such as cellular phones, set top boxes, streaming devices, personal computers, tablet computers, etc. Client 104 may include a media player 106 that can play the media presentation. For example, media player 106 may play video and/or audio.

Client 104 receives the media presentation from server 102. For example, client 104 (e.g., media player 106) may request segments of the media presentation from server 102. While receiving the segments of the media presentation, client 104 can evaluate the bandwidth in which client 104 receives the segments. One evaluation client 104 may perform is to measure the amount of the media presentation (e.g., video) received over a period of time to estimate the available bandwidth.

Depending on the available bandwidth, client 104 may make decisions on which bitrate (or version) of the media presentation to request. For example, an MBR manager 108 determines which version of the media presentation to request for a segment of the media presentation.

MBR manager 108 may use an MBR algorithm to determine when to switch to a different bitrate version of the media presentation. The MBR algorithm analyzes the available bandwidth and possibly other factors (e.g., computer processing unit load) to determine when to switch to a different bitrate. For example, if the MBR algorithm determines that the available bitrate is 2 Mbps and client 104 is requesting segments of the media presentation at a bitrate of 1 Mbps, the MBR algorithm may determine that client 104 should request segments of the media presentation encoded at 2 Mbps. An MBR system may use the media presentation description to play a media presentation.

Differential Based Media Presentation Description

Figure 2:
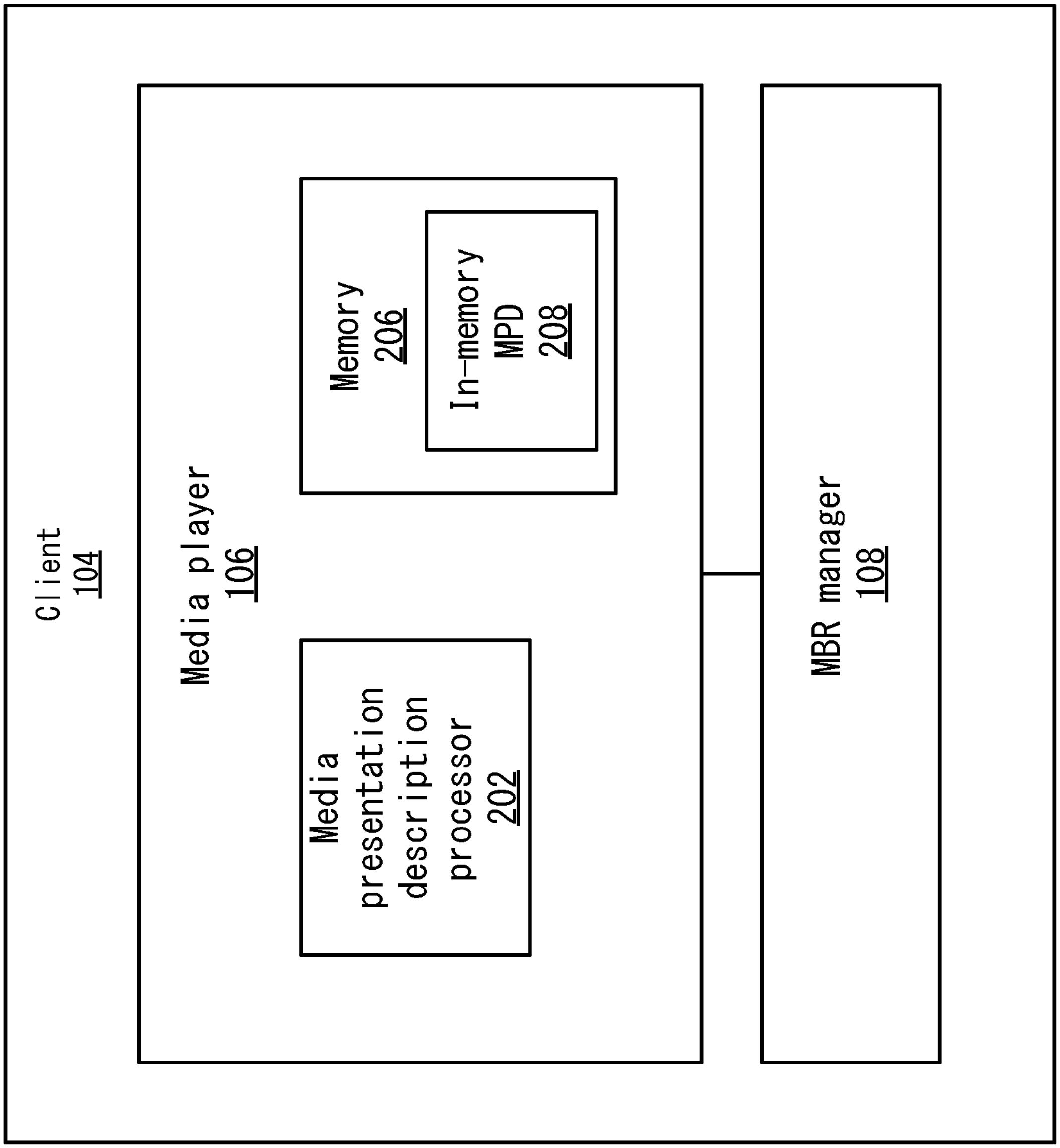
FIG. 2 depicts a more detailed example of a client according to some embodiments.

FIG. 2 depicts a more detailed example of client 104 according to some embodiments. A transport mechanism, such as a protocol specification including Dynamic Adaptive Streaming over HTTP (DASH), also known as MPEG-DASH, may be used to transport segments of a media presentation to client 104. However, HTTP Live Streaming (HLS) or other protocols may also be used. Client 104 may use a differential based media presentation description process to request segments of a media presentation. The use of differential based media presentation description allows the video delivery system to scale better, such as scaling of a live video service that offers a linear schedule of media presentations to users.

Client 104 may use two types of requests, join and patch. The join request may join a live stream for a media presentation. Also, a patch request may request a patch to a media presentation description. For example, a media presentation description processor 202 of client 104 requests patches to a media presentation description from server 102. Also, media presentation description processor 202 processes the patches and updates an in-memory media presentation description 208 in memory 206. Memory 206 may in local memory to client 104, but may also be memory attached to client 104. In-memory media presentation description 208 is the version of the media presentation description that client 104 stores in memory 206. In-memory media presentation description 208 includes a timeline of playback of the segments of the media presentation, and client 104 can keep any duration of in-memory media presentation description 208 in memory 206, keeping start over ability on programs of all durations for users. Continually extending the timelines of in-memory media presentation description 208 via patches allows client 104 to provide seamless rollover while decreasing the users' overall resource consumption because the updates do not include all the prior details of the already received segments. Seamless rollover is provided by client 104 managing the in-memory media presentation description 208. As time within the live stream advances past the logical media presentation boundary points, client 104 client can seamlessly play across multiple media presentations if client 104 has segments for both media presentations stored in in-memory media presentation description 208.

Server 102 provides an update for client 104 of segment information that is not already known. Status information is used to keep track of what information each different client 104 has received. For example, server 102 may insert status information in each communication (e.g., a patch) that is sent to client 104 that indicate what information a client 104 has already received. Client 104 may insert the status information in the next patch request to server 102. Then, server 102 uses status information to determine what information client 104 has already received from the media presentation description and then to select the information for the next patch update for client 104. Using the status information, server 102 provides a patching mechanism for updating in-memory media presentation description 208 on the client and server 102 keeps full control of the stream timeline construction.

The differential patch updates allow client 104 to request patches that are used to update in-memory media presentation description 208 rather than wholly replacing in-memory media presentation description 208. The patches may be used to perform actions, such as extending the timeline of in-memory media presentation description 208, introducing new periods in in-memory media presentation description 208, truncating/removing existing periods in the in-memory media presentation description 208, and/or introducing in-band stream events in in-memory media presentation description 208. A period may be some grouping of segments, where a live stream may have multiple periods. An in-band stream event may contain information about an advertisement that is inserted into the stream or may be other insertion content. A new period may be started for an ad insertion time period. The media presentation description may also be used to truncate the ad insertion period. Using the status information, server 102 can determine everything it has previously sent to each individual client. Server 102 may rely on clients 104 to assist in the persistence of their state, but server 102 may not rely on clients 104 performing manipulations on this state or to specifically manipulate update requests for the patches. Some embodiments place no further requirement on client 104 other than to insert the status information in a next patch request. This leaves the decision of what to include in the next patch to server 102.

Client 104 retains the full timeline of the media presentation description of the live stream in memory 206. The timeline contained within in-memory media presentation description 208 is a media presentation description that is referenced by client 104 to proceed with playback of the media presentation. For example, client 104 uses links in the in-memory media presentation description 208 to request segments of the media presentation. In-memory media presentation description 208 may be stored in different formats. For example, to allow for client efficiency, the in-memory media presentation description 208 need not be stored in full extensible markup language (XML) structure format, but stored such that all defined identifiers are preserved and usable for updating the in-memory media presentation description 208. For example, client 104 may know it is parsing a media presentation description and store the same structure information found in the media presentation description in efficiently packed data structures that are optimized to use less memory instead of using a full XML structure needed when an entire media presentation description is sent every time.

The patch updates optimally use bandwidth and reduce both server and client side processing. As all clients 104 that are up to date within a live stream share the same set of unknown information, the patch updates will be highly cacheable at server 102 (e.g., edge servers) for a majority of clients. The highly cacheable updates may mean that server 102 may cache the patches and send the same patches to multiple clients. For example, scaling to support thousands of simultaneous live presentations can, on its own, require substantial effort, as an average segment duration of four to ten seconds means the media presentation description is constantly regenerated. While a typical buffer depth of a few minutes can scale in this scenario, overlaying the full-fledged user, content, and legal requirements of a live presentation creates an excessive set of permutations, rendering most caching structures useless. To provide a somewhat scalable solution, server 102 may unify the client media presentation description consumption as much as possible, but the variances in device computational and memory capability meant that the lowest common denominator ended up driving stream complexity. Where more powerful client devices can easily handle multi-megabyte media presentation descriptions with over six hours of buffer depth, the lowest end client devices struggle with kilobyte media presentation descriptions containing under an hour of content. To provide features such as full program lookback for sporting events and fulfill contractual stream restriction requirements, the differential media presentation description may decouple the presentation scalability from device capability and stream stability.

Initial Media Presentation Description Processing

Figure 3:
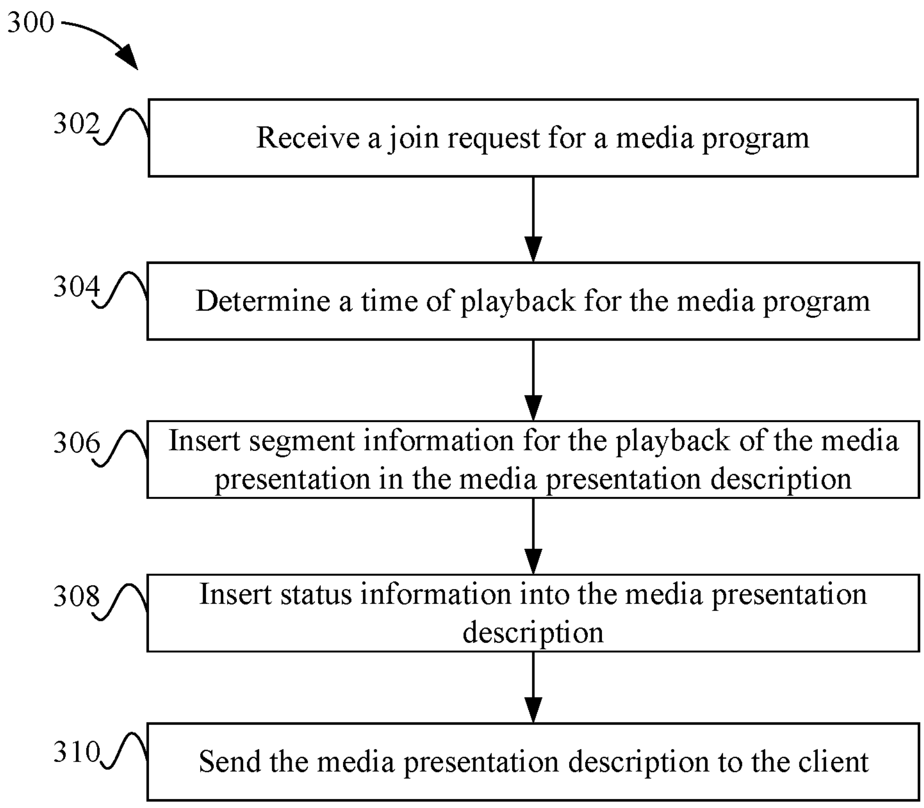
FIG. 3 depicts a simplified flowchart of a method for processing an initial join request for a media presentation according to some embodiments.

FIG. 3 depicts a simplified flowchart 300 of a method for processing an initial join request for a media presentation according to some embodiments. At 302, server 102 receives a join request for a media presentation. The join request is the first media presentation description request that client 104 issues. For example, client 104 may send a request for initial playback of a live stream of the media presentation. A user of client 104 may select the media presentation from a live service for playback on a user interface. When client 104 joins a live stream, client 104 will request everything from the start of the media presentation until the present time of playback of the media presentation from server 102. Also, the join request specifies that client 104 has the ability to process patches to the media presentation description (in contrast to the traditional method of receiving the entire media presentation description for each update). For example, clients 104 that support the patch process include a query parameter in the initial request that enables the use of patches.

At 304, server 102 determines a time of playback for the media presentation. The media presentation may have just begun playback and the time is the start of the media presentation when server 102 receives the request. However, server 102 may receive the request after the start of the media presentation and the time may be some time in the middle of the media presentation.

At 306, server 102 inserts segment information for the playback of the media presentation in the media presentation description. The media presentation description generated for this request contains all segment information from the start of the user's rights within the media presentation until the current time (e.g., the edge) of the live stream. Depending on how long a media presentation has been live there could be any number of content periods and ad periods within the live stream. Accordingly, the first instance of the media presentation description from server 102 may contain all segment information known from the requested start time. The first instance of sending the media presentation description is referred to as an initial media presentation description. The subsequent instances of the media presentation description may be referred to as patches or updates.

FIG. 4 depicts an example 400 of a media presentation description according to some embodiments. At 402, the media presentation description includes one period id of "foo-1". This period has two adaptation sets, one for video (id 1) at 404 and one for audio (id 2) at 406. A segment timeline is specified within each adaptation set that details the segment information for the representations. For example, the segment timeline may include segments from a time t=0 to a time t=60.

Referring back to FIG. 3, at 308, server 102 inserts status information into the media presentation description. For example, the status information may be a next location for a segment. In FIG. 4, at 408, server 102 has set a "Location" tag with status information, which is enough information to tell the server about the last information the client knows. In this example, the location includes an indication of a time t=70 to indicate the time for the next segment to request. In this case, client 104 has received a media presentation description up to segment t=60 (which lasts until t=70). The Location tag may describe the next request in the form of a uniform resource locator (URL) for client 104, but the exact form of this information may vary and this example is purely for illustrative purposes. For example, the Location tag may indicate that the segment at t=60 was just received. At 310, server 102 then sends the media presentation description to client 104. In another embodiment, client 104 may not announce it has the ability to process patches to the media presentation description and server 102 may still proactively provide the status information within a compatibility signaling descriptor that only compatible clients process, while incompatible clients perform normal polling and receive full media presentation descriptions.

Patch Processing

Figure 5:
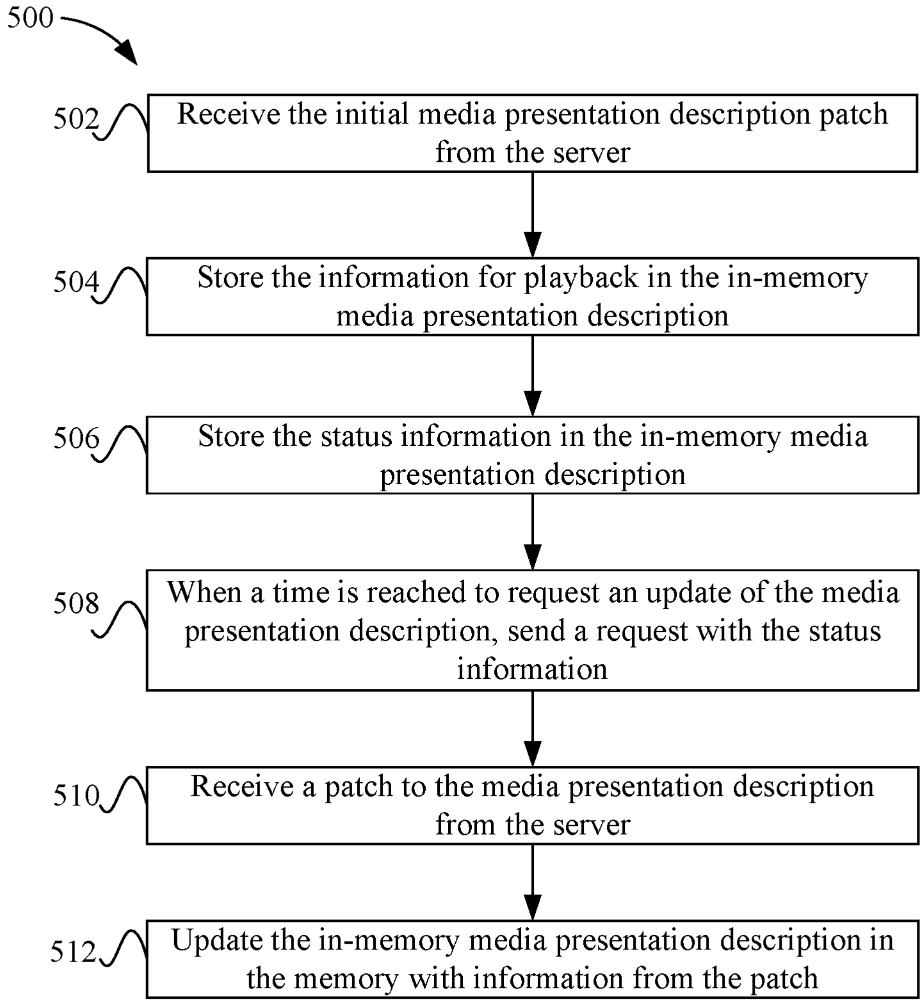
FIG. 5 depicts a simplified flowchart of a method for processing the instances of media presentation descriptions according to some embodiments.

Client 104 receives the patches to the media presentation description. FIG. 5 depicts a simplified flowchart 500 of a method for processing the instances of media presentation descriptions according to some embodiments. At 502, client 104 receives the initial media presentation description patch from server 102. The initial media presentation description patch may include information for one or more segments depending on the time that client 104 requested the live stream for the media presentation. At 504, client 104 stores information for the playback of the live stream in in-memory media presentation description 208 in memory 206. The information may include the period and adaptation sets from media presentation description 400. Also, at 506, client 104 stores the status information in in-memory media presentation description 208. The status information may be a link to the next patch.

At 508, when a time is reached to request an update of the media presentation description, client 104 sends a request with the status information. Client 104 may begin polling for updates based on an update period. If client 104 starts polling before the next segment is available, client 104 may receive a response indicating the next segment is not ready, such as a "204 No Content" response indicating content is unavailable. The "204 No Content" response indicates that the request is valid but based on the client's current timeline knowledge there is no additional content available at this time. Client 104 reacts to this status code by trying the query again at a later time, but no specification for time delay is given, because the original update period should already describe an update polling cadence.

At 510, client 104 receives a patch to the media presentation description from server 102. The patch includes an update to in-memory media presentation description 208. The patch may update different aspects of in-memory media presentation description 208, such as the patch may extend the timeline, create a new period, truncate or remove a period, or both create a new period and extend the timeline. At 512, client 104 then updates in-memory media presentation description 208 using the information in the patch.

Patch Examples

Different examples of patches will now be described. FIG. 6 depicts an example of a patch 600 that extends in-memory media presentation description 208 according to some embodiments. If a variable, such as a variable MPD@type, is set to 'dynamic' in the initial media presentation description patch (or the join request), an update to the media presentation may be presented to the client as a patch. At 602, a property descriptor, such as an essential property descriptor that is required in the patch, is inserted in the media presentation description that indicates this media presentation description is a patch. This essential property descriptor has an identifier of "@schemeIdUri" that may be equal to "urn:com:hulu:schema:mpd:patch:2017", but other schema may be used. The essential property descriptor may only be used when the timeline is set to use patch updates, such as the in-memory MPD@type is set to "dynamic". This essential property descriptor may not be present in the initial media presentation description shown in in FIG. 4 as the initial media presentation description must be a complete description. However, as a subsequent patch may not contain a syntactically complete media presentation description structure, the patch includes the property descriptor. Even though the patch does not contain the whole structure, the patch contains elements in their proper hierarchical structure to allow for unambiguous merging with the in-memory media presentation description 208. To ensure that merging is an unambiguous process, the patch provides identifying attributes for all hierarchical elements. A patch that does not meet this minimum requirement may be invalid. In some embodiments, server 102 may choose to serve the same initial media presentation description to both a regular client 104 (e.g., one does not use patches) and a patch enabled client 104. In this case, server 102 may enclose the patch location 408 with a supplemental property descriptor . This supplemental property descriptor has an identifier of "@schemeIdUri" that may be equal to "urn:com:hulu:schema:mpd:patch:2017", but other schema may be used.

Client 104 may merge the patch update into in-memory media presentation description 208 using different methods. For example, client 104 recursively walks the elements in the patch structure, matching elements in the patch to elements in the in-memory media presentation description 208 using defined identifying attributes. The attributes may be information for an additional segment, a new period, etc. Should an element in the patch be equivalent to one in the in-memory media presentation description 208, client 104 applies the attributes from the patch element to the in-memory element and the child nodes are recursively merged. Any attributes that exist in both the in-memory media presentation description 208 and the patch take the value of the patch element. If the only child nodes that an element may contain are text nodes, client 104 takes the patch text nodes as replacements to the in-memory timeline text nodes. Should an element in the patch have no equivalent element within the in-memory media presentation description 208, client 104 considers it a new element and the sub-tree with the element as a root in the patch is placed in the appropriate hierarchy in the in-memory media presentation description 208 with no further walking required for that sub-tree. Should an element from the patch result in an invalid in-memory timeline structure, this merge and the rest of the patch sub-tree with that element as a root may be ignored by client 104.

In some embodiments, the process by which client 104 merges the patch into in-memory media presentation description 208 may be as follows:

- The patch is recursively walked by client 104 using defined constraints and attributes to identify structures within the in-memory media presentation description 208 that are equivalent during the walk.
- For any element of a first type, such as a xs:simpleType, in the patch, that has an equivalent element in the in-memory media presentation description 208, the element in the patch fully replaces the element in the in-memory media presentation description 208. The first type may be a single element.
- For any element of a second type, such as a xs:complexType, in the patch, that has an equivalent element in the in-memory media presentation description 208, the attributes of the element in the patch are applied to the element in in-memory media presentation description 208, replacing any existing value, and any child sequences are merged with this process. The second type may be a parent element with child elements.

For any element in the patch that has no equivalent within the in-memory media presentation description 208, client 104 should append the sub-tree, which has said element as its root, to the in-memory media presentation description 208, based on the currently walked hierarchical structure and a defined ordering, with no further walking required for the sub-tree.

Should an element within the patch violate, or could cause the in-memory media presentation description 208 to violate, the structural requirements of the media presentation description process, the element and the sub-tree with that element as a root in the patch, should be ignored by client 104.

In some embodiments, examples of equivalence and sequence ordering include:

Equivalence for the Period, AdaptationSet, and Representation elements may be established by matching of the @id attribute. A Period is an element that contains multiple AdaptationSets and defines the portion of the media timeline the AdaptationSets make up. An AdaptationSet is an element that represents a singular elementary stream type (video, audio, text) that may have multiple representations that differ based on creation parameters (encoding bitrate, resolution, etc.). This element would contain all bitrate variants that are generated from the same source.

Equivalence and ordering for S elements can be established by a combination of the @t, @d, and @r attributes. This S element provides explicit information about a segment or set of segments within a Representation. The information it provides is used for addressing and accessing the segment.

Equivalence for elements with no identifying attributes, such as SegmentTimeline, is established by instance restrictions. This element contains all the possible S elements for the media presentation time represented by the SegmentTimeline and, per MPEG-DASH semantics, only one SegmentTimeline is allowed to exist for a given representation.

In the case of a new element that has no specification defined ordering, but may have multiple instances, the element is appended at the end of the matching hierarchical sequence. For example, a media presentation description element may contain multiple Period elements, but their ordering is dictated by parse order not by a defined ordering logic, thus new Periods are appended to the Period list.

In FIG. 6 at 604, the patch extends the in-memory media presentation description 208 by two segments for the video and by four segments for the audio at 606 according to some embodiments. The patch specifies the direct hierarchy with identifiers for the Period and AdaptationSets, then specifies a singular element of SegmentTemplate/SegmentTimeline with the information for the additional segments. For example, the Period id is “foo-1”, which is the same in the initial media presentation description. When only one SegmentTemplate/SegmentTimeline is permitted directly underneath the AdaptationSet node, the merging is unambiguous and does not require explicit identifiers for those nodes. Client 104 appends the segments to the end of the in-memory segment list as their identifying start time values (e.g., using the identifier S@t) do not match any start times in the in-memory media presentation description. The AdaptationSets contain video segments for times t=70 and t=80 with a duration d=10 time units, and audio segments at t=70, t=75, t=80, and t=85, with a duration of d=5 time units.

At 608, the patch includes new status information, which is a location for the next patch. The location embeds the combined known information into the URL. For example, this URL contains the information about the final time (e.g., t=90) present in both video and audio timelines that server 102 will use to construct the next patch. That is, t=90 is the start time for the next segment.

Another patch example may add a new period. FIG. 7 depicts a patch 700 that extends the in-memory media presentation description 208 by providing a new period whose identifier does not match any period in the in-memory media presentation description 208 according to some embodiments. In this example, an attribute, such as a Period@ start attribute, is provided to anchor the period in the media presentation timeline described by the in-memory media presentation description 208; alternatively, a Period@ start could be omitted, causing the start to be implied by the summed durations of the proceeding periods. In this example, at 702, the period identifier is “foo2”, which is different from the prior period’s identifier of “foo-1” and has a Period@start attribute of “PT70.OS”. This starts a new period with new AdaptationSets at 704 and 706.

Additionally, the patch includes new status information at 708, which is a location for the next patch embedding the combined known information into the URL. The time has been changed to t=90 as this period starts at t=70 within the media timeline and 20 seconds of segments have been announced for the period, making the next segment time t=90.

Another example of a patch may also combine an extension of the segments in a period and also create a new period. FIG. 8 depicts a patch 800 that extends the in-memory media presentation description 208 for an existing period and also provides a new period according to some embodiments. Patch 800 updates the current period with additional segments at 802. This update is similar to the update in FIG. 6. Also, at 804, patch 800 defines a new period with new segments. This update is similar to the update in FIG. 7. Additionally, patch 800 includes new status information at 806, which is a location for the next patch embedding the combined known information into the URL. The time has been changed to t=90 as the existing period was extended by 10 seconds and the new period starts at t=80 and had 10 seconds of segments announced, making the next segment time t=90.

Examples

Figures 9, 10:
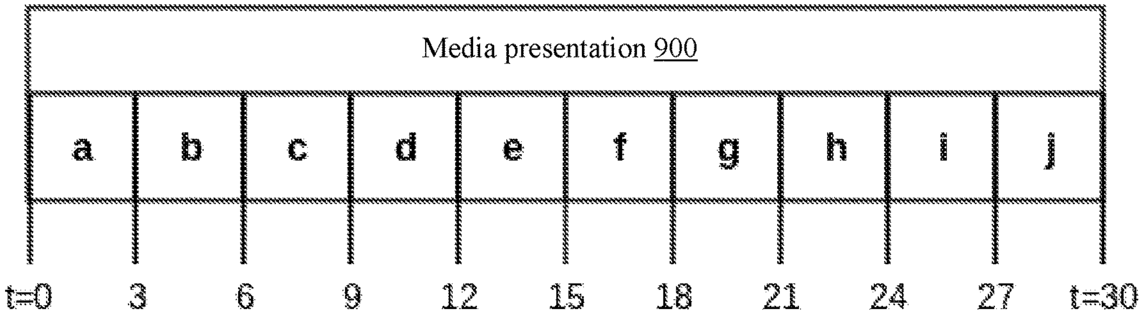
FIG. 9 depicts a media presentation according to some embodiments.
FIG. 10 depicts a call table that occurs according to some embodiments.

In the following example, client 104 is joining a live stream during a media presentation. FIG. 9 depicts a media presentation 900 according to some embodiments. The media presentation includes individual segments “a” to “j” that are three time units long and each segment is fixed at a specific time t and becomes available to clients after t+3 time units has passed. For example, segment d is fixed at t=9 and server 102 makes segment d available to client 104 at t=12 (e.g., when all the content for segment d is available). For the purposes of this example, assume the join request has a path that has a form similar to a URL link of: “https://livestream.company.com/dash/live/CTN.mpd”. For simplicity the authentication and client capability query string components are omitted from the URLs, but other implementations may contain them.

When client 104 joins the live stream for this media presentation, server 102 sends the URL of "https://livestream.company.com/dash/live/CTN.mpd?start=0&supports_patching=true" to client 104. Client 104 can use the URL to initiate its playback of the media presentation. The URL identifies the live stream for the media presentation and indicates that client 104 supports the patch update process described herein.

Depending on the time t that the client joined the stream the client would receive a different number of segments and next location URL as follows. If client 104 joined at t=3, the resulting media presentation description would contain only segment a. The status information may be a next location URL of: https://livestream.company.com/dash/live/CTN.mpd?t=3. The insertion of time t=3 into the URL indicates to server 102 that client 104 has information in its in-memory media presentation description 208 up until time t=3. If client 104 joined at t=12, the resulting media presentation description would contain segments: a, b, c, and d. The status information may be a next location URL of: https://livestream.company.com/dash/live/CTN.mpd?t=12. The insertion of time t=12 into the URL indicates to server 102 that client 104 has information in its in-memory media presentation description 208 up until time t=12.

Client 104 would then begin polling for updates on the supplied next location URL using a period, such as the period specified by a parameter MPD@minimum Update-Period. If client 104 polled before the next segment following the known time is available it will get a 204 response, otherwise the response is a patch containing any newly published segments and an updated next location in which to continue polling.

If client 104 joins at t=12 and polls at a three time unit cadence, FIG. 10 depicts a call table 1000 that occurs according to some embodiments. A first column 1002 indicates the time t at which the URL request is performed, a second column 1004 indicates the URL requested, a third column 1006 indicates the segments returned for the media presentation, and a fourth column 1008 indicates the next location URL. The first call is a join request and server 102 would retrieve and send segments a, b, c, and d to client 104. The status information may be a next location URL indicating that the location is t=12 as shown in column 1008 at 1010. After that, client 104 requests and receives segment e using the URL at 1010. The media presentation description does not include information for segments a, b, c, and d. The next location in the patch update would be a URL indicating that the location is t=15 at 1012. This process continues as client 104 requests and receives patches for segments f, g, h, i, and j along with next location URLs.

After the call at t=30, client 104 has received all segments of the program and stored the information for the segments in in-memory media presentation description 208. Now, if the user has the rights to do so, client 104 could seek anywhere in the media presentation. Seamless program rollover would be unchanged as client 104 can continue to expand the in-memory media presentation description 208 beyond the current media presentation by continuing to request patches for additional media presentations that occur after the end of this media presentation. For example, the next media presentation on the live stream may start and client 104 can request segments for that media presentation.

At some point client 104 may evict information from the in-memory media presentation description 208, such as due to environment constraints. Different mechanisms for this eviction can be used. For example, if there were no computational limits on client 104, it could theoretically persist all portions of the in-memory media presentation description 208 indefinitely, but in practice such persistence may be impractical due to rights restrictions and device memory limits. To ensure observation of any availability restrictions set forth and continued stability of client 104, client 104 may periodically evict information from the in-memory media presentation description 208.

Segment availability, as signaled by server 102 or another entity (e.g., an owner of the media presentation), may be used as a primary eviction indicator. If a segment becomes unavailable, client 104 may remove it from the in-memory media presentation description 208 as the segment is no longer useable for playback. A secondary eviction indicator may be the total size of the in-memory media presentation description 208. If client 104 detects that the size of the in-memory media presentation description 208 crosses a client specified threshold, client 104 may elect to remove segments from the beginning of the in-memory media presentation description 208 regardless of their availability to ensure client stability.

Should any segment be removed from the in-memory media presentation description 208, client 104 may update all information within the in-memory media presentation description 208 such that the remaining elements remain valid. If a segment removal results in an empty hierarchy, such as a Period with no segments, client 104 may also remove the entire hierarchy in the interest of memory management.

Cacheability

The URLs that client 104 uses to request segments contain start times that are fixed at the initial program join time. This means there is a unique URL for every program that has started during a time period, such as in the last 24 hours, even though all clients 104 are discovering the same new information on each refresh. Clients 104 can receive the same known information as this means clients 104 may always be querying for the same new stream information. So, no matter how long a client 104 has been on a live stream, that client 104 can receive the same information updates of all other clients 104.

In one example, a first client 104 could have the call pattern depicted in FIG. 10. If a second client 104 joins at t=19 with a three time unit polling time, FIG. 11 depicts the second client's call table 1100 according to some embodiments. The first join request of second client 104 would retrieve segments a, b, c, d, e, and f. The next location in the media presentation description would be a URL indicating the location is t=18 at 1110. After that, second client 104 requests and receives segment g using the URL. The next location in the media presentation description would be a URL indicating that the location is t=21 at 1112. This process continues until second client 104 receives segment j.

After the initial join request, second client 104 shares the same known information as first client 104 (the client whose call pattern is shown in FIG. 10). For example, the second client 104 from that time onward queries for the same patches using the same URLs and is able to receive the same responses as first client 104. That is, both first client 104 and second client 104 send a request for segment g using the same next location URL. Because a segment cannot be available until the segment has completed publishing, a patch is a valid representation of new information until the next expected segment publish time and thus can be cached until that next expected time. For example, the patch may be cached at an edge server that responds to clients' requests.

Failure Recovery

The above examples assumed perfect client polling behavior, but in reality it is possible for client 104 to encounter errors during polling due to situations such as resource contention or network failure. In this case, server 102 returns the latest published information for the media presentation in the next request. Since client 104 is providing the context of what information in the media presentation description has been received and stored in the in-memory media presentation description 208, server 102 is able to fulfill a request after an error and send all the latest published information for the media presentation. FIG. 12 depicts a call table 1200 showing the failure recovery according to some embodiments. In this example, a third client 104 joins the live stream at a time t=19, and the third client 104 receives segments a, b, c, d, e, and f. But, a network error occurs at 1210 and third client 104 does not receive segment g. That is, the first patch request at a time t=22 fails due to network conditions and third client 104 may wait a full update period to try again (or may keep trying).

Once the full update period has passed, third client 104 sends the patch request that includes the time t=18. The t=18 segment following the first failure has already expired at server 102 (or the edge cache) so server 102 generates a new patch with all the new segments that third client 104 does not have, which are segments g and h, and a next location that reflects the gained knowledge of these two segments of a time t=24. In this case, server 102 knows from the status of t=18 in the request that third client 104 includes segments up to segment f. Thus, server 102 can determine that third client 104 needs segments g and h. Then, at time t=28, third client 104 is back to sharing the update cache with the other clients at 1212 because the next request with the location t=24 is the same as other clients. Even if the edge cache of the patch request for time t=18 were to not expire in time, the next location request URL that server 102 embedded in the cached response still properly represents the next request that third client 104 must make, meaning that third client 104 will never be able to skip a patch and miss information about the media presentation description.

Backwards Compatibility

Due to the minimal information returned in a patch, the updates provided for clients 104 that understand the dynamic patching method may not be backwards compatible with clients 104 that do not use the dynamic patching method. To handle an environment with both types of clients, service providers may choose to either explicitly separate or share media presentation descriptions among these clients 104.

If a service provider wishes to provide explicitly separate media presentation descriptions, it may do so by providing clients 104 with initial media presentation description locations that signal the client compatibility. One form of this signal is an additional query string parameter, but a more complex form may entail different server paths or domain names.

If a service provider wishes to provide a shared media presentation description, it may signal the patch behavior within the original media presentation description and signals related to the media presentation description patch behavior may be wrapped with a Supplemental property element of SupplementalProperty with an identifier @schemeIdUri set to an attribute enabling the patching method, such as "urn:mpeg:dash:patch:2018". For instance, a media presentation description containing a Location element with a media presentation description patch location would be contained within an appropriate SupplementalProperty so that clients supporting this behavior will follow the Location element, while clients that do not will refresh from the initial location to receive a full media presentation description. One example of using the Supplemental property element is:

<SupplementalProperty schemeIdUri="urn:com:hulu:schema:mpd:2017:patch">
<Location>../live/channel.mpd?t=70</Location>
</SupplementalProperty>

Conclusion

Accordingly, the process enables clients 104 that are viewing a live stream for an arbitrary amount of time with: highly cacheable responses for the majority of clients, minimal processing on the server side, minimal parsing and processing on the client side, and optimal usage of data bandwidth.

System

Figure 13:
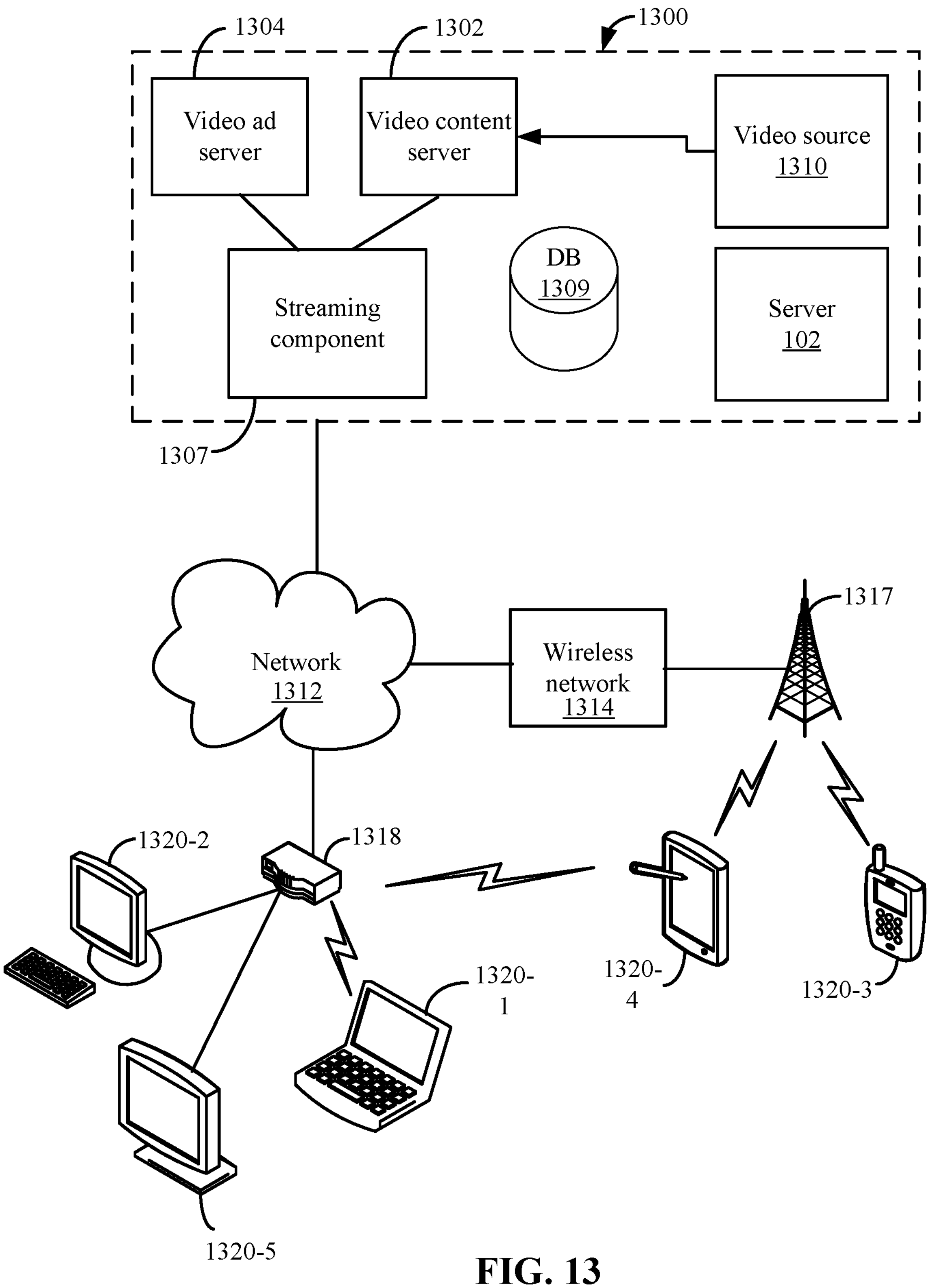
FIG. 13 depicts a video streaming system in communication with multiple client devices via one or more communication networks according to one embodiment.

Features and aspects as disclosed herein may be implemented in conjunction with a video streaming system 1300 in communication with multiple client devices via one or more communication networks as shown in FIG. 13. Aspects of the video streaming system 1300 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 1300, video data may be obtained from one or more sources for example, from a video source 1310, for use as input to a video content server 1302. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 1300 may include one or more computer servers or modules 1302, 1304, and/or 1307 distributed over one or more computers. Each server 1302, 1304, 1307 may include, or may be operatively coupled to, one or more data stores 1309, for example databases, indexes, files, or other data structures. A video content server 1302 may access a data store (not shown) of various video segments. The video content server 1302 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 1304 may access a data store of relatively short videos (e.g., 10 second, 30 second, or 60 second video advertisements)

configured as advertising for a particular advertiser or message. The advertising may be provided for an advertiser in exchange for payment of some kind or may comprise a promotional message for the system 1300, a public service message, or some other information. The video advertising server 1304 may serve the video advertising segments as directed by a user interface controller (not shown).

The video streaming system 1300 also may include server 102.

The video streaming system 1300 may further include an integration and streaming component 1307 that integrates video content and video advertising into a streaming video segment. For example, streaming component 1307 may be a content server or streaming media server. A controller (not shown) may determine the selection or configuration of advertising in the streaming video based on any suitable algorithm or process. The video streaming system 1300 may include other modules or units not depicted in FIG. 13, for example, administrative servers, commerce servers, network infrastructure, advertising selection engines, and so forth.

The video streaming system 1300 may connect to a data communication network 1312. A data communication network 1312 may comprise a local area network (LAN), a wide area network (WAN), for example, the Internet, a telephone network, a wireless cellular telecommunications network (WCS) 1314, or some combination of these or similar networks.

One or more client devices 1320 may be in communication with the video streaming system 1300, via the data communication network 1312, wireless cellular telecommunications network 1314, and/or another network. Such client devices may include, for example, one or more laptop computers 1320-1, desktop computers 1320-2, "smart" mobile phones 1320-3, tablet devices 1320-4, network-enabled televisions 1320-5, or combinations thereof, via a router 1318 for a LAN, via a base station 1317 for a wireless cellular telecommunications network 1314, or via some other connection. In operation, such client devices 1320 may send and receive data or instructions to the system 1300, in response to user input received from user input devices or other input. In response, the system 1300 may serve video segments and metadata from the data store 1309 responsive to selection of media programs to the client devices 1320. Client devices 1320 may output the video content from the streaming video segment in a media player using a display screen, projector, or other video output device, and receive user input for interacting with the video content.

Distribution of audio-video data may be implemented from streaming component 1307 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 1307 may communicate with client device 1320 using control messages and data messages to adjust to changing network conditions as the video is played. These control messages can include commands for enabling control functions such as fast forward, fast reverse, pausing, or seeking to a particular part of the file at the client.

Since streaming component 1307 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 1307 may use TCP-based protocols, such as HTTP and Real Time Messaging Protocol (RTMP). Streaming component 1307 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 14:
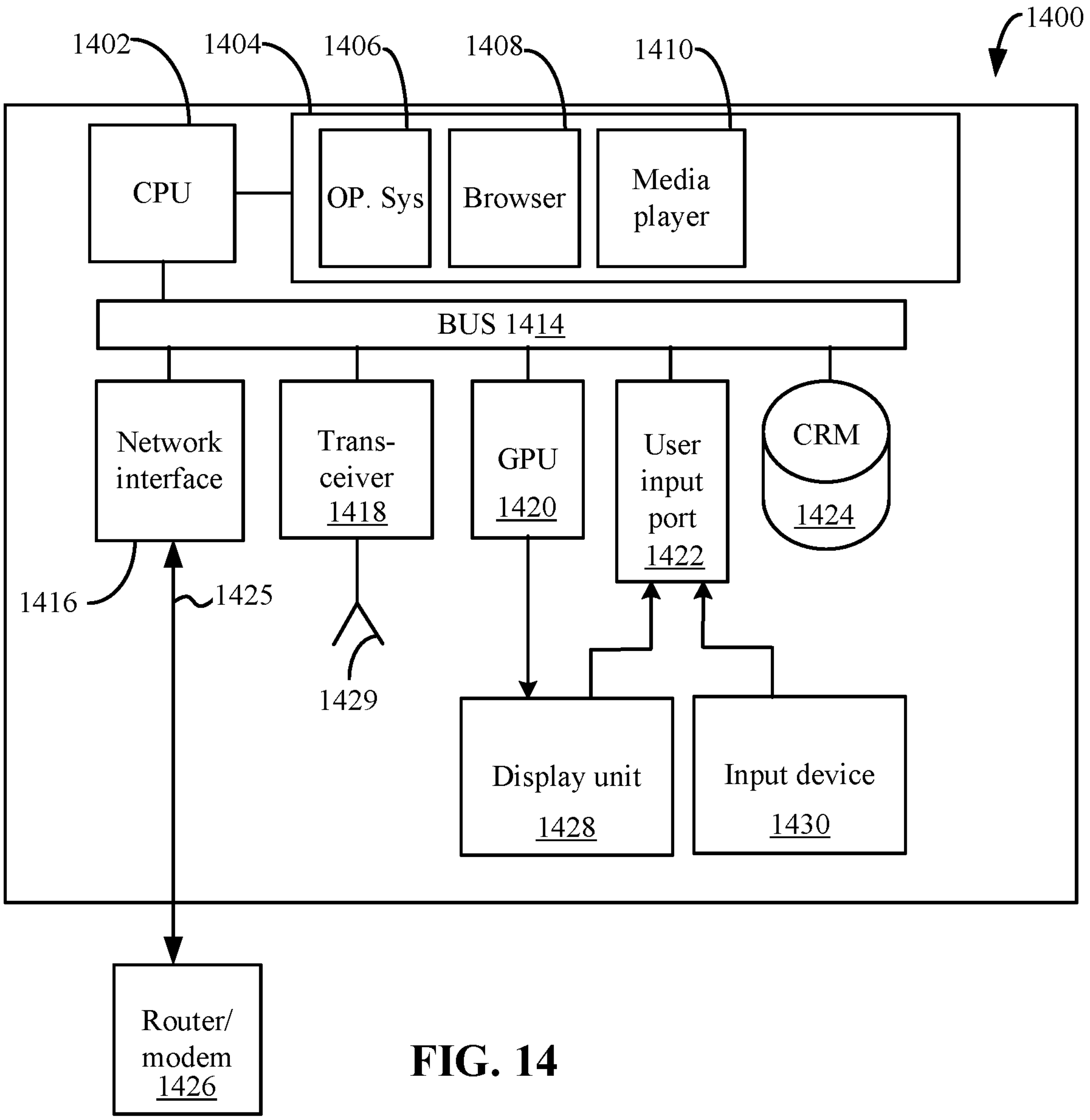
FIG. 14 depicts a diagrammatic view of an apparatus for viewing video content and advertisements.

Referring to FIG. 14, a diagrammatic view of an apparatus 1400 for viewing video content and advertisements is illustrated. In selected embodiments, the apparatus 1400 may include a processor (CPU) 1402 operatively coupled to a processor memory 1404, which holds binary-coded functional modules for execution by the processor 1402. Such functional modules may include an operating system 1406 for handling system functions such as input/output and memory access, a browser 1408 to display web pages, and media player 1410 for playing video. The memory 1404 may hold additional modules not shown in FIG. 14, for example modules for performing other operations described elsewhere herein.

A bus 1414 or other communication component may support communication of information within the apparatus 1400. The processor 1402 may be a specialized or dedicated microprocessor configured to perform particular tasks in accordance with the features and aspects disclosed herein by executing machine-readable software code defining the particular tasks. Processor memory 1404 (e.g., random access memory (RAM) or other dynamic storage device) may be connected to the bus 1414 or directly to the processor 1402, and store information and instructions to be executed by a processor 1402. The memory 1404 may also store temporary variables or other intermediate information during execution of such instructions.

A computer-readable medium in a storage device 1424 may be connected to the bus 1414 and store static information and instructions for the processor 1402; for example, the storage device (CRM) 1424 may store the modules 1406, 1408, 1410 and 1412 when the apparatus 1400 is powered off, from which the modules may be loaded into the processor memory 1404 when the apparatus 1400 is powered up. The storage device 1424 may include a non-transitory computer-readable storage medium holding information, instructions, or some combination thereof, for example instructions that when executed by the processor 1402, cause the apparatus 1400 to be configured to perform one or more operations of a method as described herein.

A communication interface 1416 may also be connected to the bus 1414. The communication interface 1416 may provide or support two-way data communication between the apparatus 1400 and one or more external devices, e.g., the streaming system 1300, optionally via a router/modem 1426 and a wired or wireless connection. In the alternative, or in addition, the apparatus 1400 may include a transceiver 1418 connected to an antenna 1429, through which the apparatus 1400 may communicate wirelessly with a base station for a wireless communication system or with the router/modem 1426. In the alternative, the apparatus 1400 may communicate with a video streaming system 1300 via a local area network, virtual private network, or other network. In another alternative, the apparatus 1400 may be incorporated as a module or component of the system 1300 and communicate with other components via the bus 1414 or by some other modality.

The apparatus 1400 may be connected (e.g., via the bus 1414 and graphics processing unit 1420) to a display unit 1428. A display 1428 may include any suitable configuration for displaying information to an operator of the apparatus 1400. For example, a display 1428 may include or utilize a liquid crystal display (LCD), touchscreen LCD (e.g., capacitive display), light emitting diode (LED) display, projector, or other display device to present information to a user of the apparatus 1400 in a visual display.

One or more input devices 1430 (e.g., an alphanumeric keyboard, microphone, keypad, remote controller, game controller, camera or camera array) may be connected to the bus 1414 via a user input port 1422 to communicate information and commands to the apparatus 1400. In selected embodiments, an input device 1430 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1428, for example using a touch sensitive screen. A cursor control device may communicate direction information and command selections to the processor 1402 and control cursor movement on the display 1428. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:

sending, by a computing device, a first instance of a media presentation description to a client including first information to allow the client to request a first set of segments of a media presentation, the first instance of the media presentation description including status information for a request for an update to the media presentation description to indicate which segments the client has received;

receiving, by the computing device, the request for the update to the media presentation description from the client, the request indicating which segments the client has received based on the status information;

identifying, by the computing device, a latest segment that the client has already received in the media presentation from the request; and sending, by the computing device, a second instance of the media presentation description to the client including second information to allow the client to request a second set of segments that occur after the latest segment in the media presentation as an update to the first instance of the media presentation description, wherein the second instance of the media presentation description excludes at least a portion of the first information that was sent in the first instance of the media presentation description.

2. The method of claim 1, wherein the client stores a representation of the media presentation description for the first set of segments of the media presentation.

3. The method of claim 2, wherein the client updates the representation of the media presentation description with the second information upon receiving the second instance of the media presentation description.

4. The method of claim 2, wherein the client appends the second information to the representation of the media presentation description upon receiving the second instance of the media presentation description.

5. The method of claim 2, wherein the client replaces a portion of the representation of the media presentation description with at least a portion from the second instance of the media presentation description.

6. The method of claim 2, wherein:

the second instance of the media presentation description includes a new period for playback of the media presentation, and the client generates the new period in the representation.

7. The method of claim 2, wherein:

the client appends the second set of segments to a first period, the second instance of the media presentation description includes a second period for playback of the media presentation, and the client generates the second period in the representation of the media presentation description.

8. The method of claim 1, wherein:

wherein the status information comprises first status information, and the second instance of the media presentation description to the media presentation description includes second status information to indicate which segments the client has received, wherein the second status information is different from the first status information.

9. The method of claim 8, further comprising:

receiving a second request for a second instance of the media presentation description to the media presentation description, the second request including the second status information;

using the second status information to identify the latest segment the client has already received in the media presentation; and sending a third instance of the media presentation description to the media presentation description for a third set of segments that occur after the latest segment in the media presentation as another update to the media presentation description, wherein the third instance of the media presentation description excludes at least a portion of the first information for the first set of segments and the second information for the second set of segments.

10. The method of claim 1, wherein the status information comprises a link to request the second set of segments.

11. The method of claim 1, wherein:

multiple segments are available for the media presentation after the latest segment, and the second set of segments includes the multiple segments.

12. The method of claim 1, wherein:

a single segment is available for the media presentation after the latest segment, and the second set of segments includes the single segment.

13. The method of claim 1, wherein the second instance of the media presentation description is cached and used to respond to the request from the client and respond to requests for the second instance of the media presentation description from other clients.

14. The method of claim 1, wherein the status information is included in a supplemental property of the first instance of the media presentation description and the second instance of the media presentation description, wherein the supplemental property is an optional property that indicates the client optionally can use the status information.

15. The method of claim 1, wherein the status information is based on a next location of a segment after the first set of segments.

16. A non-transitory computer-readable storage medium containing instructions, that when executed, control a computer system to be configured for:

sending a first instance of a media presentation description to a client including first information to allow the client to request a first set of segments of a media presentation, the first instance of the media presentation description including status information for a request for an update to the media presentation description to indicate which segments the client has received;

receiving the request for the update to the media presentation description from the client, the request indicating which segments the client has received based on the status information;

identifying a latest segment that the client has already received in the media presentation from the request; and sending a second instance of the media presentation description to the client including second information to allow the client to request a second set of segments that occur after the latest segment in the media presentation as an update to the first instance of the media presentation description, wherein the second instance of the media presentation description excludes at least a portion of the first information that was sent in the first instance of the media presentation description.

17. A method comprising:

receiving, by a computing device, a first instance of a media presentation description including first information to allow a first set of segments of a media presentation to be requested for playback, the first instance of the media presentation description including status information for a request for an update to the media presentation description to indicate which segments the computing device has already received in the media presentation;

storing, by the computing device, the first information for the first set of segments in a representation of the media presentation description in storage;

sending, by the computing device, a request for an update to the media presentation description to a server, the request indicating which segments the client has received based on the status information;

receiving, by the computing device, a second instance of the media presentation description from the server as an update to the first instance of the media presentation description, the second instance of the media presentation including second information to allow a second set of segments that occur after a latest segment in the media presentation that the computing device has already received to be requested for playback, wherein the second instance of the media presentation description excludes at least a portion of the first information for the first set of segments that was sent in the first instance of the media presentation description; and updating, by the computing device, the representation of the media presentation description in the storage with the second information for the second set of segments.

18. The method of claim 17, further comprising:

appending the second information to allow the second set of segments to be requested to the representation of the media presentation description upon receiving the second instance of the media presentation description.

19. The method of claim 17, further comprising:

replacing a portion of the representation of the media presentation description with at least a portion from the second instance of the media presentation description.

20. The method of claim 17, wherein:

wherein the status information comprises first status information, and the second instance of the media presentation description to the media presentation description includes second status information to indicate which segments the computing device has received, wherein the second status information is different from the first status information.

21. The method of claim 17, further comprising:

sending a second request for a third instance of the media presentation description to the media presentation description, the second request including the second status information; and receiving a third instance of the media presentation description as an update to the second instance of the media presentation description, the third instance of the media presentation including third information to allow a third set of segments that occur after a latest segment in the media presentation that the client has already received to be requested for playback, wherein the third instance of the media presentation description excludes at least a portion of the first information for the first set of segments and the second information for the second set of segments.

* * * * *